May 16, 1961 W. W. POCKMAN ET AL 2,984,338
STOCK FEEDER
Filed March 26, 1958 2 Sheets-Sheet 1
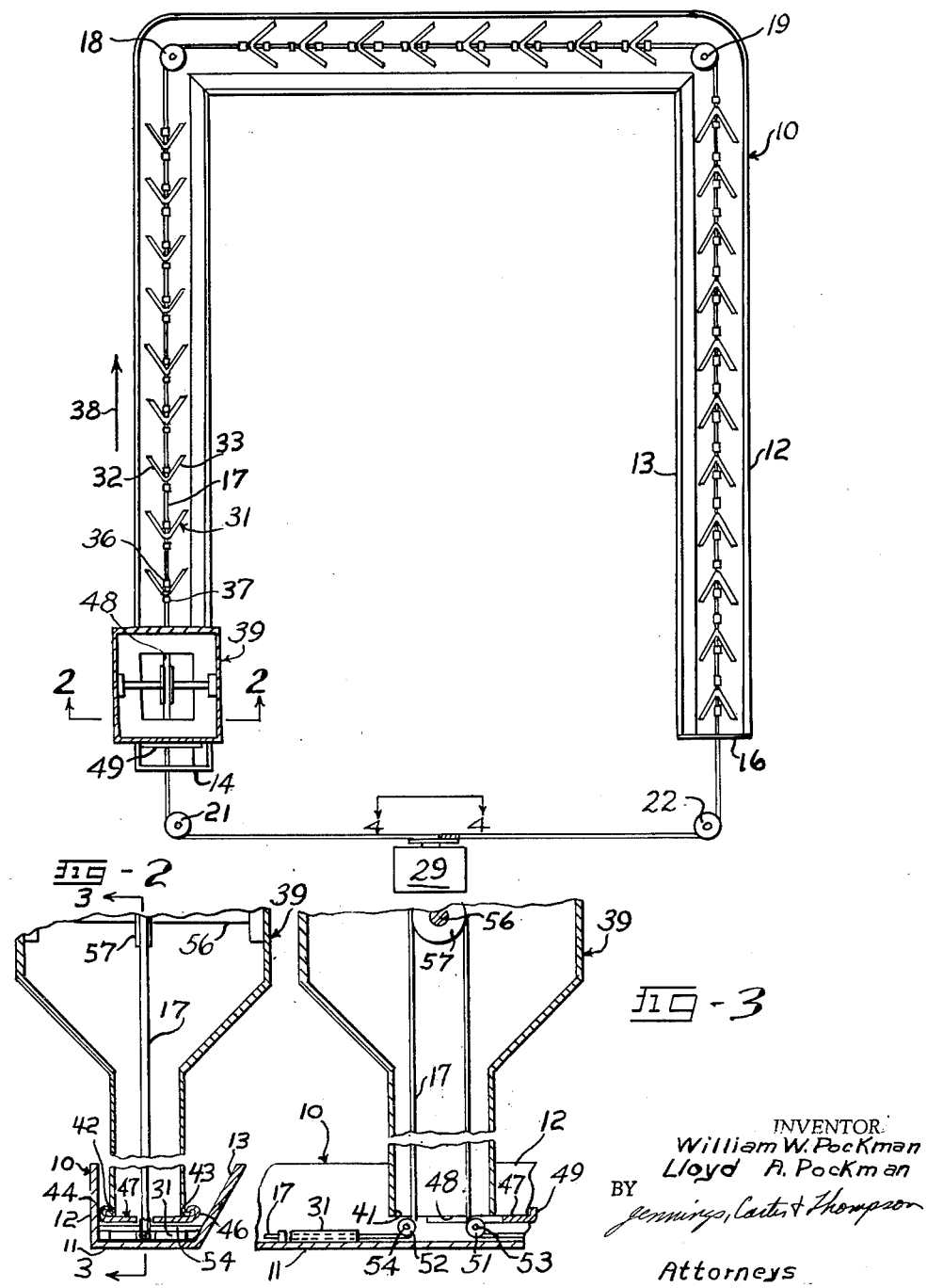
INVENTOR
William W. Pockman
Lloyd A. Pockman
BY
Jennings, Carter & Thompson
Attorneys

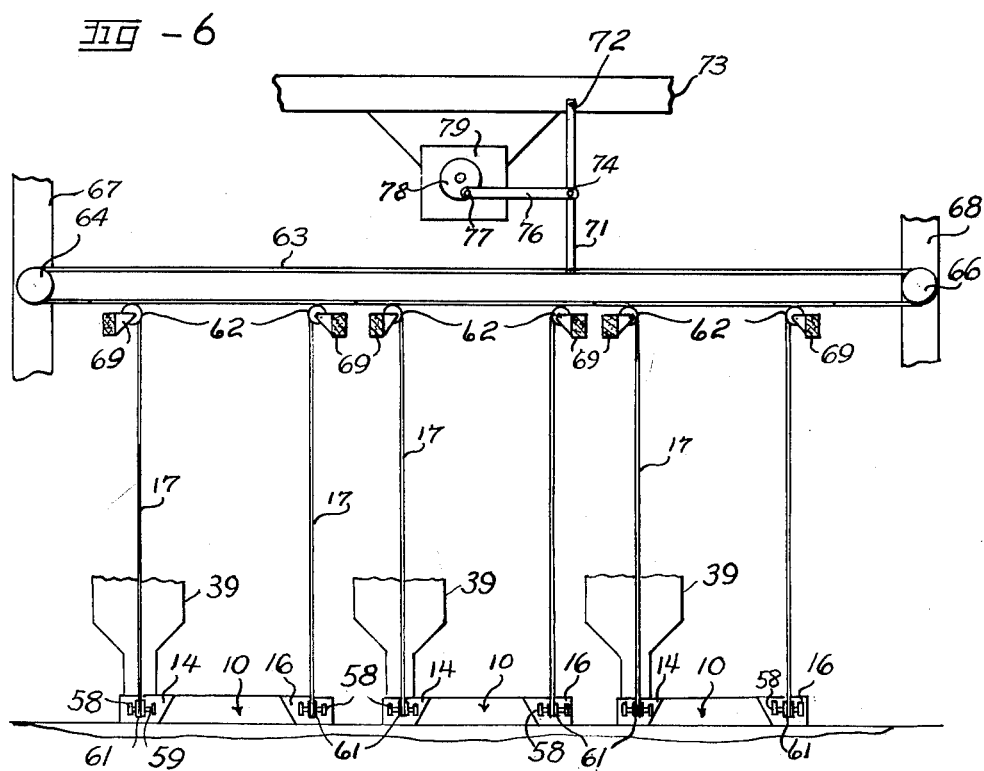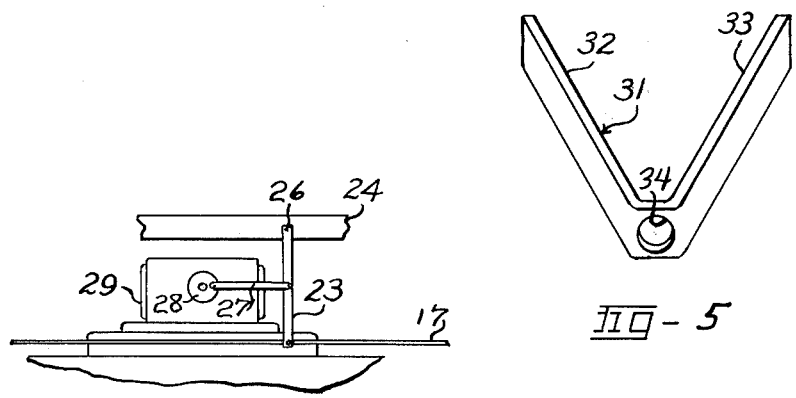

:::::::::::::::::::::::::::::::::::::::::::::::::::::::::::::::::

2,984,338
Patented May 16, 1961

2,984,338
STOCK FEEDER

William W. Pockman and Lloyd A. Pockman, both % L. A. Pockman Mfg. Co., Decatur, Ala.

Filed Mar. 26, 1958, Ser. No. 724,054

1 Claim. (Cl. 198—224)

This invention relates to a stock feeder and more particularly to means for moving feed in one direction and longitudinally of a feed trough with a reciprocating member.

An object of our invention is to provide a stock feeder of the character designated which shall include a flexible member extending longitudinally of the feed trough and having a plurality of longitudinally spaced feed impellers mounted thereon and adapted upon movement of the impellers in one direction to push feed forward and upon movement in the opposite direction to move relative to the feed whereby the feed is moved forward upon reciprocating the flexible member.

Another object of our invention is to provide a stock feeder of the character designated which shall include a hopper having a discharge passageway therein in communication with the feed trough, together with improved means for agitating the feed within the hopper whereby an even flow of feed is maintained from the hopper at all times.

A further object of our invention is to provide a stock feeder of the character designated which shall include improved means for reciprocating the flexible member carrying the impellers.

A still further object of our invention is to provide a stock feeder of the character designated which shall be simple of construction, economical of manufacture and one which is particularly adapted for use with conventional type poultry cages and the like.

Apparatus embodying features of our invention is illustrated in the accompanying drawings, forming a part of this application, in which:

Fig. 1 is a plan view, partly broken away and in section, showing a U-shaped stock feeder;

Fig. 2 is an enlarged sectional view taken generally along the line 2—2 of Fig. 1;

Fig. 3 is a sectional view taken generally along the line 3—3 of Fig. 2;

Fig. 4 is an enlarged fragmental view taken generally along the line 4—4 of Fig. 1;

Fig. 5 is an enlarged perspective view showing one of our improved impellers; and, Fig. 6 is an end elevational view, partly broken away and in section, showing a modified form of our invention.

Referring now to the drawings for a better understanding of our invention, we show a U-shaped feed trough which preferably is in the form of a substantially horizontal, open-top conduit 10 which affords access by the stock, such as poultry or the like, to the feed contained within the conduit. The conduit 10 comprises a bottom wall 11 and side walls 12 and 13. Preferably, the side wall 13, which is the side from which the stock feeds, slopes upwardly and outwardly, as shown in Fig. 2. The side wall 12 may extend in a substantially vertical plane, as shown. The ends of the trough 10 are closed by end walls 14 and 16, as shown in Fig. 1.

Extending longitudinally of the conduit 10 is a flexible member 17, such as a cable or the like. As shown in Fig. 1, suitable sheaves 18 and 19 are provided within the conduit 10 adjacent the corners thereof for directing the flexible member 17 around the corners. Also, sheaves 21 and 22 are mounted outwardly of the ends 14 and 16, respectively, in position to be engaged by the ends of the flexible member 17. The ends of the flexible member 17 outwardly of the end walls 14 and 16 form an actuating member for the remaining portion of the flexible member 17 within the conduit. As shown in Fig. 4, the ends of the flexible member are connected to one end of a link 23. The other end of the link 23 is pivotally connected to a stationary support member 24 by means of a pivot pin 26. Pivotally connected to the link 23 intermediate the ends thereof is one end of an arm 27. The other end of the arm 27 is eccentrically connected to a drive member 28 which is driven by a suitable motor 29. As the drive member 28 rotates, the arm 27 moves back and forth to reciprocate the lower end of the link 23, thus imparting reciprocatory motion to the flexible member 17.

Mounted on the flexible member 17 within the conduit 10 is a plurality of longitudinally spaced feed impellers 31. Each feed impeller 31 is in the form of an angular member having relatively flat sides 32 and 33 which extend in substantially vertical planes, as shown in Fig. 5. A centrally disposed opening 34 is provided in the vertex of the angular member 31 for receiving the flexible member 17 with a loose fit whereby the impeller is adapted for pivotal movement relative to the flexible member. Longitudinal movement of the impellers 31 relative to the flexible member 17 is limited by suitable stop members 36 and 37 provided on the flexible member 17 at the forward and rear sides, respectively, of the impellers 31.

As shown in Fig. 1, the sides 32 and 33 of the impellers 31 extend outwardly and forwardly in the direction of feed flow indicated generally by the arrow 38. The outwardly and forwardly extending sides 32 and 33 of the impellers thus form inclined surfaces which are adapted upon movement of the impellers in the direction of the arrow 38 to push the feed forward. On the other hand, when the impellers 31 are moved in the reverse direction, the inclined surfaces formed by the sides 32 and 33 move relative to the feed whereby the feed is not moved in a rearward direction. Accordingly, as the flexible member 17 is reciprocated by the motor 29, the feed is moved forward upon forward movement of the impellers and upon reverse movement of the impellers, the inclined surfaces formed by the walls 32 and 33 permit the impellers to move relative to the feed without moving the feed rearwardly.

Mounted adjacent the receiving end of the conduit 10 is a feed hopper 39 having a discharge passageway 41 adjacent the lower end thereof which is in communication with the conduit 10, as shown in Figs. 2 and 3. The lower end of the hopper 39 is provided with out-turned flanges 42 and 43 which form guideways for inturned flanges 44 and 46 of a sliding plate valve member 47. An elongated slot 48 is provided in the valve plate member 47 for receiving the flexible member 17, as shown in Figs. 1, 2 and 3. The forward end of the slot 48 is open whereby the valve plate member 47 may be moved to fully open position. The rear end of the valve plate member 47 is turned upwardly at 49 to form an operating handle.

Mounted for rotation beneath and adjacent opposite sides of the discharge passageway 41 are sheaves 51 and 52 for directing the flexible member 17 into and from the feed hopper. The sheaves 51 and 52 are mounted on suitable shafts 53 and 54, respectively, which are supported from the sidewalls 12 and 13 of the conduit 10, as shown in Fig. 2. Mounted adjacent the upper portion of the hopper 39 is a transverse shaft 56 which supports a sheave 57. As shown in Figs. 2 and 3, the flexible member 17 passes beneath the sheave 51 and over the sheave 57 and then under the sheave 52 whereby the cable 17 reciprocates within the feed hopper 39 to agitate the feed and thus assure an even discharge of the feed into the conduit 10 at all times.

Referring now to Fig. 6 of the drawings, we show a modified form of our invention in which a plurality of substantially U-shaped conduits 10 are provided. Each of the conduits 10 is provided with end walls 14 and 16 and are of the same construction as the conduit 10 shown in Fig. 1. Feed is supplied to the conduits 10 shown in Fig. 6 by suitable feed hoppers 39, as shown. Also, extending through the end walls 14 and 16 are the flexible members 17 which carry the feed impellers 31 within the conduits 10, as described hereinabove.

Mounted on and projecting outwardly of the end walls 14 and 16 are suitable brackets 58 which support transverse shafts 59. Mounted on the shafts 59 are sheaves 61 under which the flexible members 17 pass and then extend upwardly, as shown in Fig. 6. The upper ends of the flexible members 17 pass over sheaves 62 and are secured to the lower flight of an endless flexible member 63 which may be in the form of a cable. The flexible member 63 passes over sheaves 64 and 66 which are supported by suitable stationary frame members 67 and 68, respectively. The sheaves 62 are supported by suitable supporting brackets 69.

Attached to the upper flight of the endless flexible member 63 is the lower end of a link 71. The upper end of the link 71 is pivotally connected by a pin 72 to a suitable supporting frame member 73. Pivotally connected to the link 71 intermediate the ends thereof, by means of a pivot pin 74, is an actuating arm 76. The other end of the arm 76 is pivotally connected by a pin 77 to an eccentric drive member 78 which is driven by a suitable motor 79. It will thus be seen upon rotation of the eccentric drive member 78, the flexible member 63 is reciprocated, thus imparting reciprocatory motion to the impellers 31 within the conduits 10.

From the foregoing, it will be seen that we have devised an improved stock feeder in which the feed is moved in a single direction along a longitudinally extending trough by reciprocatory propelling means. By providing a longitudinally extending flexible member which carries a series of longitudinally spaced impellers having inclined surfaces thereon, the feed is moved forward upon movement of the impellers in one direction and the impellers moved relative to the feed when they are moved in the opposite direction whereby the feed is continuously moved forward upon reciprocatory motion of the impellers. Also, by providing a series of U-shaped conduits for distributing the feed to the stock, the apparatus requires a minimum of space and a single actuating member may be employed to actuate a plurality of flexible members carrying the impellers. Furthermore, by passing the flexible member through the feed hopper, the feed is discharged from the hopper in an even and controlled manner.

While we have shown the actuating members which are connected to the ends of the flexible members 17 as being in the form of cables or other flexible members, it will be apparent that a rod or the like could be employed.

While we have shown our invention in but two forms, it will be obvious to those skilled in the art that it is not so limited, but is susceptible of various changes and modifications without departing from the spirit thereof, and we desire, therefore, that only such limitations shall be placed thereupon as are specifically set forth in the appended claim.

What we claim is:

In a conveyor for moving feed in a conduit, an elongated flexible member adapted to fit within and extend longitudinally of a conduit, a plurality of longitudinally spaced feed impellers carried by said flexible member, each of said impellers comprising a pair of substantially vertical diverging side plates rigidly connected to each other and generally V-shaped as viewed in plan whereby feed is received between the side plates and is pushed forward in one direction of travel and in the opposite direction the side plates move relative to the feed, each impeller having an opening adjacent its vertex receiving said flexible member whereby said impeller is adapted for pivotal movement relative to the flexible member, stop members mounted on said flexible member to limit longitudinal movement of the impellers relative to the flexible member, and means to reciprocate said flexible member whereby the feed is moved forward by said impellers.

References Cited in the file of this patent

UNITED STATES PATENTS

| | | |
|---|---|---|
| 731,003 | Willson | June 16, 1903 |
| 1,408,080 | Davis | Feb. 28, 1922 |
| 2,314,316 | Schlesman | Mar. 16, 1943 |
| 2,785,792 | Cordis | Mar. 19, 1957 |
| 2,791,978 | Nordquist et al. | May 14, 1957 |

FOREIGN PATENTS

| | | |
|---|---|---|
| 780,979 | France | Feb. 18, 1935 |